Figure 12:
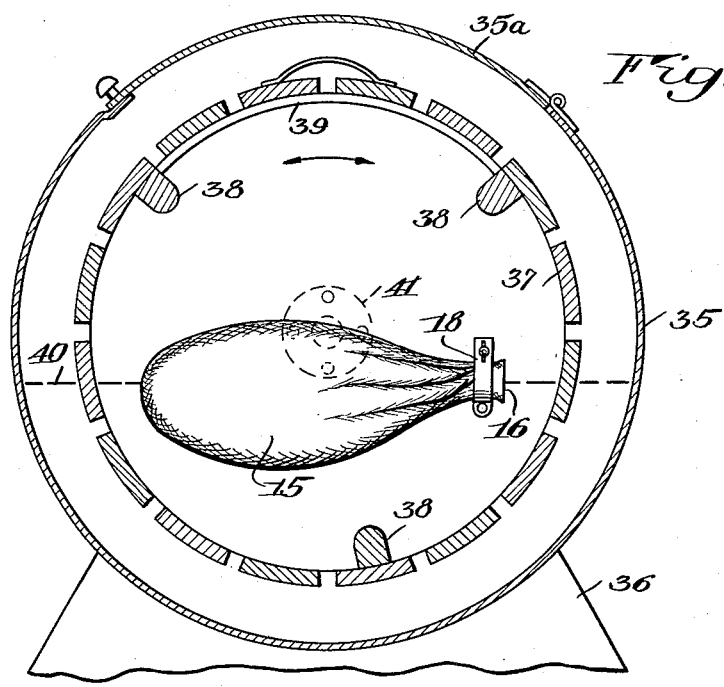

Oct. 18, 1938.     A. N. SPÁNEL     2,133,584
METHOD AND APPARATUS FOR WASHING GARMENTS
Filed Jan. 31, 1935     5 Sheets-Sheet 1
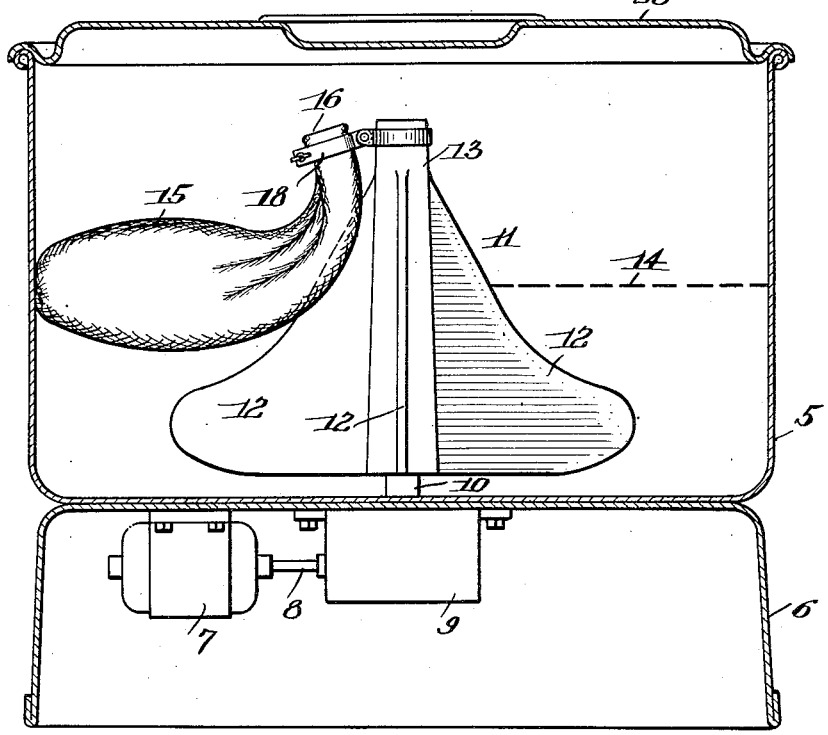
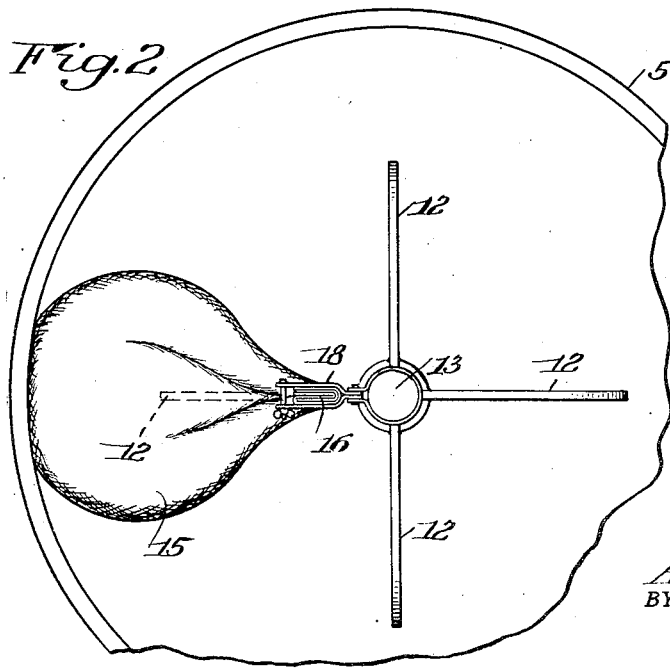
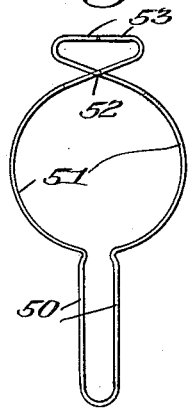
INVENTOR
Abraham N. Spanel
BY D. Clyde Jones
his ATTORNEY Oct. 18, 1938.　　　A. N. SPÁNEL　　　2,133,584
METHOD AND APPARATUS FOR WASHING GARMENTS
Filed Jan. 31, 1935　　　5 Sheets-Sheet 2
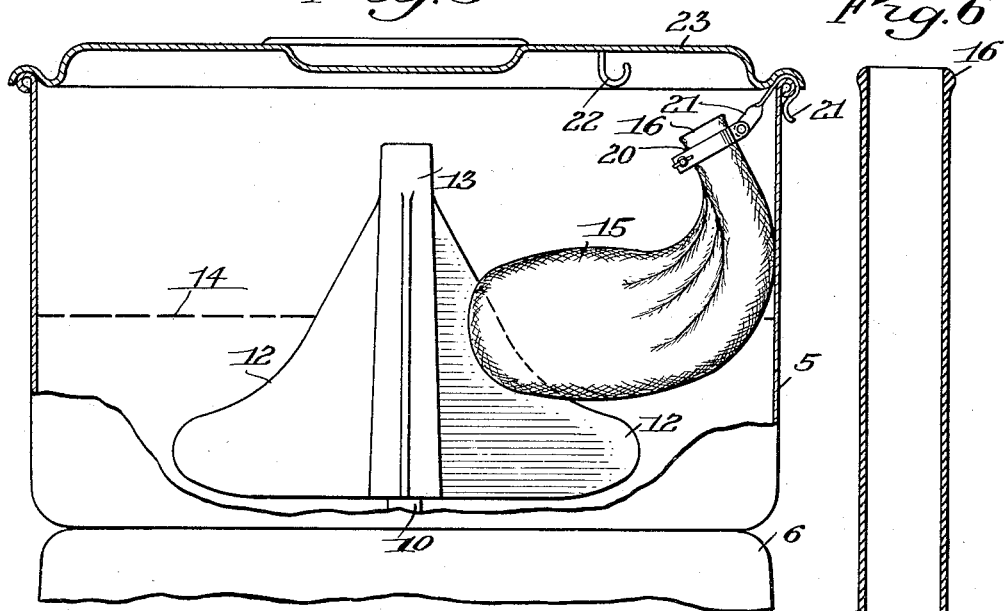
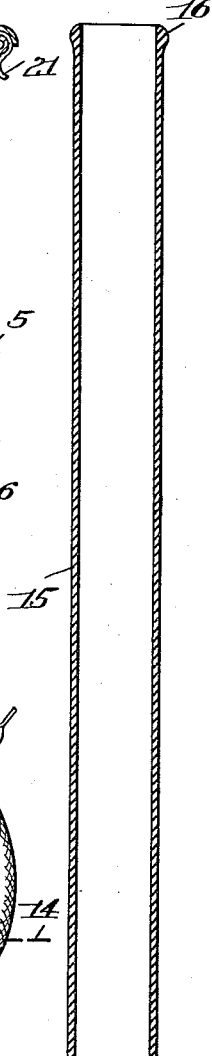
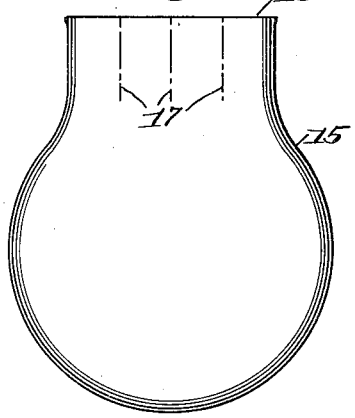
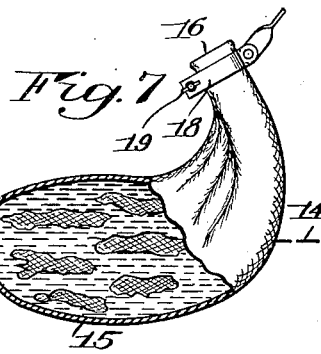
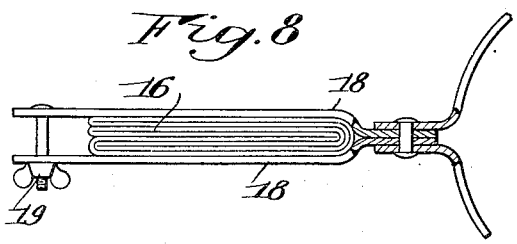
INVENTOR
Abraham N. Spanel
BY D. Clyde Jones
his ATTORNEY Oct. 18, 1938.    A. N. SPÁNEL    2,133,584
METHOD AND APPARATUS FOR WASHING GARMENTS
Filed Jan. 31, 1935     5 Sheets-Sheet 3
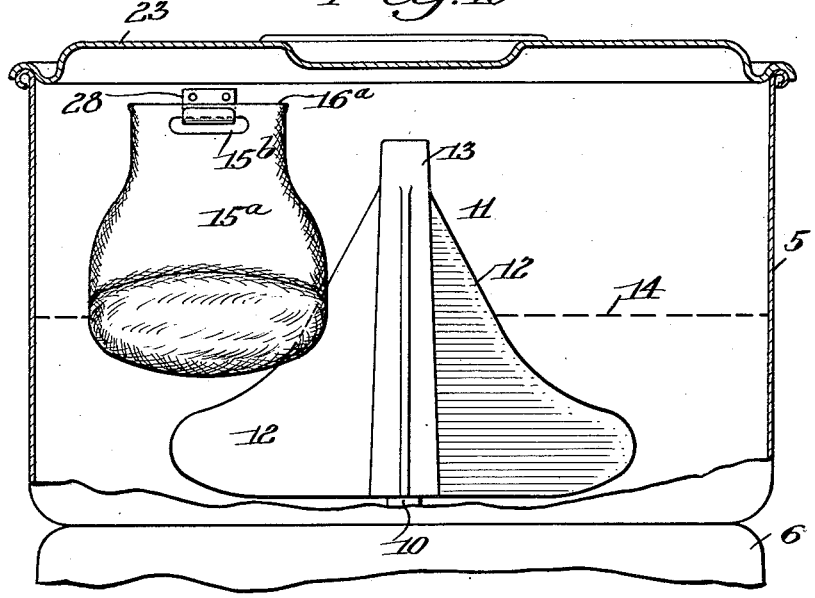
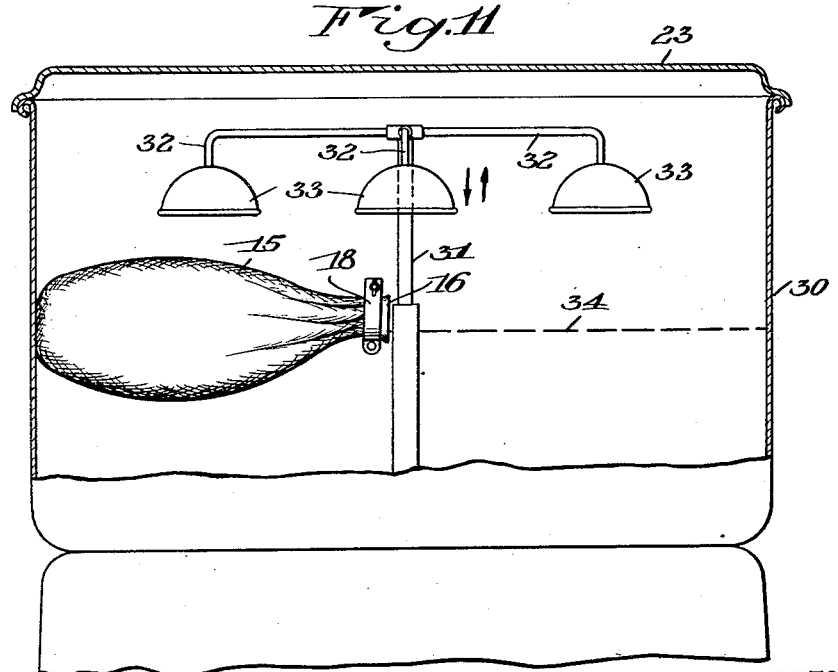
INVENTOR
Abraham N. Spanel
BY D. Clyde Jones
his ATTORNEY Oct. 18, 1938.　　　　A. N. SPÁNEL　　　　2,133,584
METHOD AND APPARATUS FOR WASHING GARMENTS
Filed Jan. 31, 1935　　　5 Sheets-Sheet 4

INVENTOR
*Abraham N. Spanel*
BY D. Clyde Jones
his ATTORNEY

Oct. 18, 1938. A. N. SPANEL 2,133,584
METHOD AND APPARATUS FOR WASHING GARMENTS
Filed Jan. 31, 1935 5 Sheets—Sheet 5
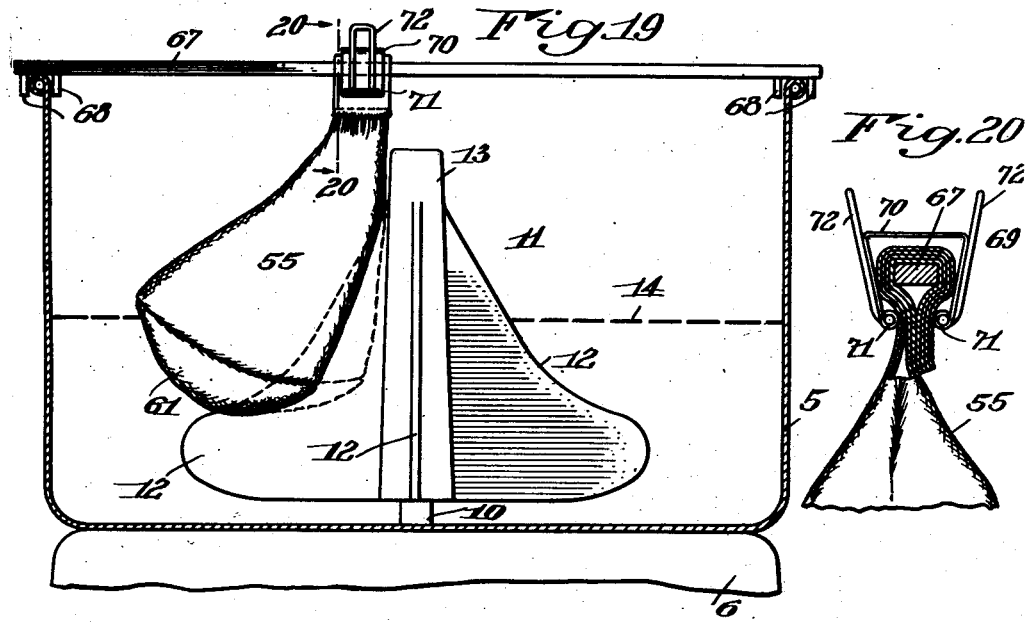
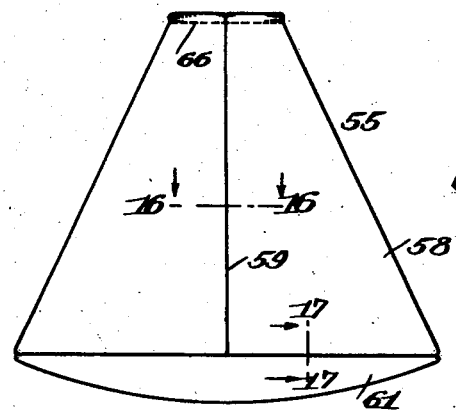
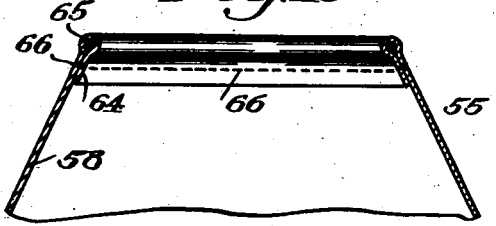
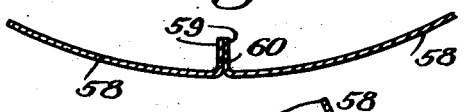
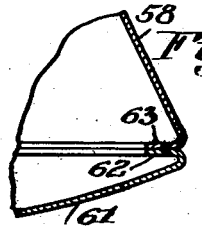
INVENTOR
Abraham N. Spanel
BY D. Clyde Jones
his ATTORNEY Patented Oct. 18, 1938

2,133,584

UNITED STATES PATENT OFFICE 2,133,584

METHOD AND APPARATUS FOR WASHING GARMENTS

Abraham N. Spánel, Rochester, N. Y.

Application January 31, 1935, Serial No. 4,335

9 Claims. (Cl. 8—159)

This invention relates to the method of and to apparatus for washing garments.

In present types of washing machines, silk stockings, delicate garments and the like, since they directly contact moving metal machine parts, are subjected to damaging abrasive action.

In such machines, it is also necessary to separate the white from the colored clothes due to the fact that the dyes may "run" and stain the white clothes. Furthermore, the ordinary size household washing machine is ill-adapted to wash a small number of garments, since it is necessary to fill the tub with water and soap to the required water level in order to obtain proper washing action, so that frequently the housewife rather than go to the trouble of filling the washing machine, prefers to wash the garments manually. Also in the washing of baby diapers and the like, it is undesirable to soil the washing machine, so that the woman is usually forced to wash such articles by hand.

Ordinary household washing machines are ill-adapted for use in cleaning garments with chemical solutions such as naptha, carbon tetrachloride and the like since these chemicals ruin the packing materials in the machine and the large amounts of chemical necessary for proper cleaning action, renders it impractical and uneconomical to use the machine for this purpose in the home.

The main feature of the invention therefore, relates to a method of washing garments wherein they are prevented from coming in contact with any metal, wood, or other hard part tending to tear or subject them to undue abrasive action.

A further feature of the invention relates to a garment and washing fluid container made of flexible, substantially impervious material and adapted to be combined with a washing machine in such a manner that the oscillation, rotation or any other action of the moving parts of the washing machine during operation, directly or indirectly agitates the garments and the cleaning fluid in the flexible container.

Another feature of the invention relates to the combination with a washing machine having a moving agitator, of a flexible, substantially impervious container for garments and washing fluid attached to the agitator.

Still another feature of the invention relates to a garment and washing fluid container made of flexible, substantially impervious material and adapted to be agitated in the course of the operation of the machine.

Still another feature of the invention relates to a flexible, substantially impervious container adapted to receive a cleaning fluid and garments to be washed therein, and means for sealing the opening in the container.

Figure 13:
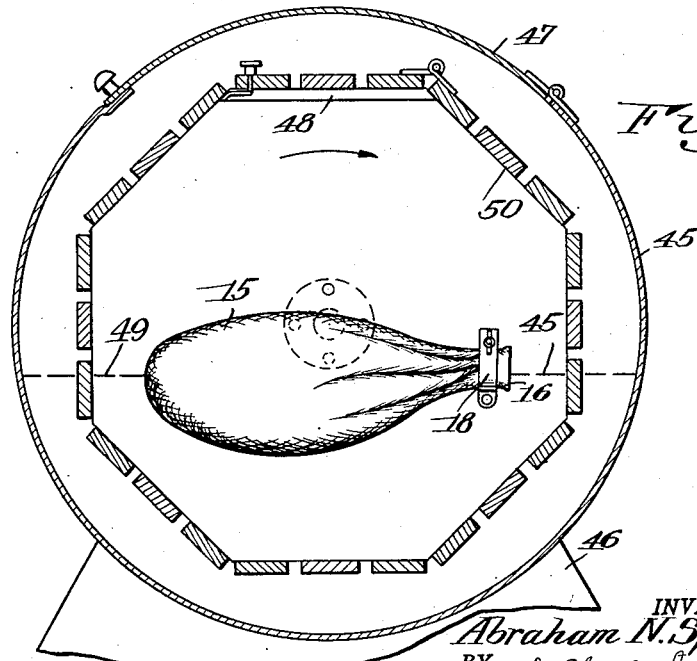

These and other features of the invention will appear from the detailed description and claims when taken with the drawings in which Fig. 1 is a vertical sectional view taken through a washing machine of the agitator type showing the flexible clothing container of the invention attached to the agitator thereof; Fig. 2 is a fragmentary plan view of the washing machine and the container of Fig. 1; Fig. 3 also shows a part of a washing machine of the agitator type with a portion of the tub broken away, illustrating the manner in which a flexible container of the present invention can be attached to a stationary part of a washing machine in the path of the agitator, or in the path of the agitated water in the washing machine; Fig. 4 is a front view and Fig. 5 is an edge view of the container forming a part of the present invention; Fig. 6 is an enlarged vertical sectional view of the container; Fig. 7 is a perspective view of the container and one form of sealing and attaching-clamp, a portion of the wall of the container being broken away to disclose the contents of the container; Fig. 8 is a top view of one form of suitable container and a fragment of a clamp partially in section, illustrating the manner in which the container may be folded on itself and clamped in order to seal the garments and cleaning fluid therein; Fig. 9 is a plan view of a modified type of clamp suitable for sealing the container; Fig. 10 illustrates a slightly different arrangement for supporting the container in a washing machine; Fig. 11 illustrates the invention applied to a so-called vacuum cup type of washing machine in which the tub and cover of the machine are shown partially in section; Fig. 12 is a vertical section of a washing machine of the oscillating drum type having the sealed container and its contents floating therein; Fig. 13 is a vertical section through a washing machine of the rotary drum type having the sealed container and its contents floating therein; Fig. 14 is a side elevation of a modified form of bag or container; Fig. 15 is a vertical section of a fragment thereof; Figs. 16 and 17 are sectional views of said container taken respectively on the lines 16—16 and 17—17 of Fig. 14; Fig. 18 is a sectional view of the fabric utilized in the container of Fig. 14; Fig. 19 is a vertical section through a washing machine showing a modified arrangement for supporting the container on the rim of the tub of the machine; and Fig. 20 is a view partially in section taken on the line 20—20 of Fig. 19 showing the manner in which the container is closed and attached to the support.

Although the invention may be used with any type of washing machine having an oscillating or other moving part, it is shown in Figs. 1 and 2 applied to an agitator or gyrator type of washing machine. This washing machine may include a tub 5 mounted on a suitable support including the legs 6. On the underside of the support there is provided a motor 7, the rotatable shaft 8 of which enters a box 9 also mounted on the underside of the support. Box 9 contains any suitable mechanism whereby a vertical shaft 10, which passes through a water-tight connection in the bottom of the tub, can be oscillated by the rotatable motor shaft. An agitator generally designated 11 is mounted or keyed in any suitable manner on the vertical shaft 10 to partake of the oscillating motion thereof. This agitator 11 can be made in various forms but as herein shown it is provided with four equally spaced paddles 12 radiating from a hub 13. The tub can be provided with a removable cover 23.

As is well-known, in using such a washing machine, the garments to be washed are dropped into the tub around the paddles 12 and the washing machine is then filled with soap and water to a predetermined water level 14. The motor 7 is thereafter set into operation to rotate the motor shaft 8 which actuates the mechanism in the box 9 to oscillate the vertical shaft 10. The agitator or gyrator 11 partakes of the motion of this vertical shaft and oscillates or gyrates the garments and the water or soap solution contained in the tub. If the garments are of delicate texture, such as silk, they may be injured by contacting either with the interior metal surface of the tub or with the paddles 12, or caught between the agitator and the bottom of the tub. Also in washing garments in this type of tub, it is necessary to separate the white from the dyed clothes in order to prevent the dye, which frequently dissolves or "runs", from staining the white fabrics.

In accordance with the present invention, a flexible bag or container 15 of substantially impervious material, best illustrated in Figs. 4, 5 and 6, is provided for use in combination with a washing machine. This container, which is open at its top 16, is made of any suitable waterproof material such as latex, rubber-coated fabric, moulded rubber or synthetic rubber now sold under the trade name "Duprene" or any like material. As shown in Figs. 1 and 2, the opening in the top 16 of the container is sealed by a suitable clamp generally designated 18, which clamp is herein illustrated as demountably attached to the hub 13 of the agitator.

In use, the container 15 (Fig. 7) is partially filled with garments to be washed and with a suitable cleaning fluid, such as soap and water, and the top portion of the bag may be folded upon itself on the lines 17 (Fig. 4), so that it can be inserted between the jaws of the clamp 18 (Fig. 8). The set screw 19 when tightened causes the jaws of the clamp 18 to seal the opening in the top of the bag. It will be understood that the invention is not limited to this particular type of clamp since any suitable means for sealing the container may be used. In fact, it may be sealed by tying with a string or like material. For example, the clamp may be formed from a single rod or strip of steel or similar material. This rod or strip is bent upon itself to provide two parallel jaws 50 which are adapted to receive and grip the folded over end 16 of the container 15. These jaws merge into semi-circular portions 51 adapted to engage the hub 13 of the agitator. The end portion of the strip or rod after crossing each other at 52 terminate in opposing hook-shaped parts 53. These parts are also adapted to grip various parts of the washing machine. The folded top portion 16 of the container is inserted laterally between the jaws 50, passing between the junction of the jaws and the circular parts 51. To open the hooks 53 the circular parts 51 are forced toward each other. The clamp itself may be rubber covered.

In using the invention, the washing machine is filled with soap and water to a predetermined water level 14 in accordance with the usual practice and coarser clothes may be introduced therein. The sealed container with garments and cleaning fluid therein is attached by means of the clamp 18 to the hub 13 of the agitator 11. The washing machine is then started in operation and the fins or paddles 12 of the agitator 11 strike the container 15 which is held by the clamp 18 between the agitator and the inner wall of the tub, so that the garments and the washing fluid in the container are agitated to effect washing action. It should be understood that it is not necessary to put water in the tub 5 of the washing machine in order to effect the washing action, but the container with the garments and washing fluid therein, may be attached to the hub 13 and the washing machine operated without water therein, in which case the fins or paddles 12 of the agitator will oscillate the garments and the cleaning fluid in the container in substantially the same manner as if the tub contained water.

It will be appreciated that instead of using soap and water to clean the garments in the container or bag 15, any suitable cleaning fluid such as carbon tetrachloride, naptha, or similar cleaning fluids may be placed in the container with the garments to be cleaned and the cleaning operation effected in the manner just described. However, where a chemical cleaning fluid is used, it is necessary to make the container of some flexible impervious material which is not attacked by the fluid. For this purpose synthetic rubber such as "Duprene", can be used instead of latex or other similar materials.

In the modified form of the invention shown in Fig. 3, the container 15 with the garments and cleaning fluid therein, are shown supported by a clamp 20 provided with a hook 21 which may be hooked over the edge of the tub 5. In this form of the invention, the container 15 is supported in such a position that it will engage the inner surface of the tub and be held in such position, that the agitator in its oscillating movement will cause its fins or paddles 12 to strike the container periodically causing the contents thereof to be agitated. While the container is illustrated as supported either on the hub of the agitator and on the edge of the tub, it will be understood that it can be supported on a hook 22 fixed at any convenient point on the underside of the cover 23 of the tub.

Instead of supporting the container 15 and its contents on a movable or stationary part of the machine, the container while filled with garments and cleaning fluid and then sealed, can be dropped into the machine where it floats and is agitated in the same manner as are the garments to be washed, that is, the container is hydraulically actuated.

In Fig. 10 there is illustrated a modified type of flexible container designated 15a. This container may be made of any impervious material, such as that previously described, but differs from the container previously referred to in that the top opening 16a therein is not sealed. Instead, there are provided near the top of the container, two opposing openings 15b, so that the container can be suspended from any convenient stationary or movable part of the washing machine. As herein shown, there is fastened on the inner wall of the tub 5, a rather wide hook-shaped element 28, the hook of which is adapted to pass through the opposing openings 15b in the container. This hook is so positioned that when the container is suspended therefrom, its lower portion will be in the path of the paddles of the oscillating gyrator. The mechanism for oscillating the gyrator has not been disclosed since it will be of the conventional type.

In Fig. 11 there is disclosed a washing machine of the reciprocating and oscillating cup type with the sealed container and its contents simply floating therein. The construction of this type of washing machine is well-known, and it is merely necessary to point out that it includes a tub 30 through the bottom of which there projects a vertical rod 31 adapted to be reciprocated vertically and oscillated horizontally by a motor (not shown) in any suitable manner. The vertical rod 31 has radiating arms 32 on the ends of which there are provided hemispherical cups 33 which open downwardly. As is well-known, the tub, during use, is filled with washing fluid and clothes to a predetermined water level 34 and the reciprocating and oscillating cups alternately force and suck the washing fluid through the clothes. In using the present invention with this type of washing machine, the container 15 is filled with clothes and cleaning fluid, after which it is sealed by a suitable clamp 18. The sealed container 15 can then be dropped into the tub to float on the cleaning fluid and clothes therein. As the washing machine operates, some of the reciprocating cups will intermittently strike the outside of the container 15 to agitate the clothes and washing fluid therein to promote washing action, or the agitated water in the tub will itself create sufficient impact on the container 15 to wash its contents.

In Fig. 12, the invention is shown utilized in connection with the washing machine of the type in which the cylinder first rotates a predetermined number of times in one direction, and then a predetermined number of times in the opposite direction. In this figure, the washing machine is illustrated in its simplest form without any of its mechanism for effecting rotation of its cylinder. This washing machine includes a cylindrical tub 35 supported on a suitable base 36, which tub has an opening in its top which may or may not be closed by a hinged cover 35a. Within the tub there is provided a cylinder 37 having perforated walls and having slats 38 projecting toward the axis of the cylinder, a portion 39 of the cylinder being removable to permit the introduction of garments therein. The cylinder is arranged to be rotated on its axis in suitable supports 41 mounted in the ends of the tub. Suitable mechanism which it is unnecessary to disclose, since it is of the conventional type, rotates the cylinder 37 a predetermined number of times in one direction and then rotates the cylinder a certain number of times in the reverse direction.

In utilizing the invention with this type of washing machine, the cover of the tub 37 is opened and the portion 39 of the cylinder removed. Garments are placed within the cylinder and water and soap are introduced therein until the water reaches the level indicated by the broken line 40. The container 15 of this invention after being filled with garments and cleaning fluid through its top opening 16, is sealed by the clamp 18. Thereafter, the sealed container is dropped into the cylinder to float on the clothes therein. Then, the portion 39 of the cylinder is locked in place and the cover 35a of the tub closed. In the operation of this type of washing machine, the slats 38 on the interior of the rotating cylinder tend to carry the clothes up toward the top of the cylinder, after which they drop to the bottom of the cylinder, which repeated raising and dropping of clothes tends to force water and soap through them. It will be understood that as the cylinder rotates first in one direction, and then in the other, the contents of the sealed container 15 will be agitated to sufficiently promote the washing action.

In Fig. 13 the invention is illustrated in connection with a simple drum type of washing machine. This machine includes a tub 45 supported on a suitable base 46 and having a hinged cover 47. Within the tub there is provided a hexagonal drum 50 having perforated walls and adapted to be rotated, by means not shown, in one direction on its long axis within the tub 45. This drum has a detachable side 48 through which the garments may be introduced therein.

In using the invention with this type of washing machine, the cover 47 is opened and the section 48 of the drum is removed so that the garments and washing fluid may be introduced therein to a level indicated at 49. Thereafter, the container 15 is filled with garments and cleaning fluid through its top 16 and then sealed by the clamp 18. The sealed container is dropped into the drum and the section 48 of the drum fastened in the position illustrated. It will be understood that as the drum is rotated, the clothes therein will be "tumbled" to promote the washing action. The sealed container 15 and its contents will therefore also be subjected to a turbulent action so that the contents therein are agitated to promote washing action.

In Figs. 14 to 18 inclusive, there is illustrated a modified form of bag 55 preferably made of impervious, flexible material, such as a fabric 56 coated on each side thereof with a layer 57 of rubber or other water-proof material. The container 55 is preferably made from a piece 58 of the fabric having its side margins 59 fastened together as by means of stitching 60. The bottom of the container is closed by a circular piece 61 of the fabric having its edge 62 attached to the lower margin 63 of the piece 58, such as by stitching. The top of the container is left open and its top edge reinforced by folding the margin 64 thereof over a cord 65, the margin 64 being fastened to the piece 58, such as by stitching 66. It will be understood that in making the container the various parts are stitched together while it is wrong side out, after which it is turned so that in use the seams are on the inside.

While this container can be used instead of containers previously described, it is particularly adapted for use in the manner indicated in Figs. 19 to 20. In Fig. 19 there is illustrated a washing machine substantially the same as that shown in Fig. 1, which machine includes the tub 5, the base or support 6. This washing machine is also provided with an agitator 11, which is arranged to be oscillated by the vertical shaft 10 in turn oscillated by means not shown. This agitator includes the hub 13 and the radiating paddles 12. In this arrangement, the container 55 is attached to a support 67 adapted to rest on the rim of the tub 5. This support may be made of a strip of wood or like material provided at each end with a pair of spaced lugs or pins 68. The pins of each pair being adapted to engage respectively the inner and the outside surface of the rim of the tub. The container 55 can be fastened to the support in any convenient manner, as herein illustrated, it is fastened thereto by folding its top portion about the support (Fig. 20), in which position it is held by a clamp generally designated 69. This clamp is formed of a U-shaped spring 70 to the lower ends 71 of which there are hingedly connected the U-shaped arms 72 by which the jaws of the clamp can be opened.

It will be appreciated that the container 55 can be attached to the support 67 so that the blades 12 will directly strike container 55 or the container can be merely supported between the inner wall of the tub and the agitator, so that the agitator does not directly strike the container but agitates the water in the tub, which turbulent water in turn agitates the container and its contents.

It will be obvious that the support 67 instead of resting on the rim of the tub 5 can be supported on legs resting on the bottom of the tub.

Although the invention has been described in connection with the washing machines being used in their normal fashion to wash other garments at the same time that garments in the container 15 are being washed, it should be specifically understood that garments in the container 15 can be, for the most part, washed in any of these washing machines by the operation of the machine when it is otherwise empty. While the invention has been shown applied to various types of washing machines, it is applicable to all other types of washing machines in which some moving part agitates or disturbs the water and garments to be washed.

What I claim is:

1. In combination with a washing machine having a tub and a moving part therein, a container made of flexible, substantially impervious material to enclose garments and cleaning fluid and having an opening therein, and means for supporting said container with its opening uppermost and with the margin of the container at said opening held together, in said tub for agitation caused by said moving part.

2. In combination with a washing machine having a movable washing part, a container made of flexible, substantially impervious material, said container being adapted to hold cleaning fluid and garments to be cleaned, and means for supporting said container in said machine for external agitation by said movable part.

3. In combination with a washing machine having a movable washing part, a flexible container made of substantially impervious material adapted to hold a cleaning fluid and garments to be cleaned and having an opening near the top thereof, and means for attaching said container to said movable washing part with the container in a position to retain liquid therein.

4. In combination with a washing machine having a movable washing part, a flexible container made of substantially impervious material adapted to hold a cleaning fluid and garments to be cleaned and having an opening therein, means for closing the opening in said container, and means for attaching the closed container to said movable washing part.

5. In combination with a washing machine having a stationary part and a movable washing part, a container made of flexible, substantially impervious material to hold garments and cleaning fluid, and having an opening therein, and means for suspending said container adjacent the margin of the opening therein, on said stationary part for external agitation caused by said movable part.

6. In combination with a washing machine having a stationary part and a movable washing part therein, a container made of flexible, substantially impervious material to hold garments and cleaning fluid and having an opening therein, means for substantially sealing said opening, and means for supporting said container on said stationary part for agitation caused by said movable washing part.

7. In combination with a washing machine having a stationary part and a movable washing part therein, a container made of flexible, substantially impervious material and having an opening therein, means for closing said opening by drawing together the material at the margin of the opening, and means for supporting said container on said stationary part in the path of said moving part.

8. The method of simultaneously washing two or more batches of garments which comprises, placing one batch of garments and a cleaning fluid in a washing machine, enclosing another batch of garments and cleaning fluid in a flexible, substantially impervious container, at least partially submerging said container in said first-mentioned cleaning fluid in said washing machine, and operating said washing machine to wash the first batch of garments and to simultaneously agitate said container and its contents.

9. The method of washing garments which comprises enclosing the garments and a cleaning fluid in a closed container made of substantially impervious, flexible material, at least partially submerging the container and its contents in a liquid, and agitating the liquid to promote washing action within the container.

ABRAHAM N. SPÁNEL.